(12) United States Patent
Galstian et al.

(10) Patent No.: US 10,234,710 B2
(45) Date of Patent: Mar. 19, 2019

(54) METHOD OF WAFER SCALE FABRICATION AND ASSEMBLY OF A LIQUID CRYSTAL ELECTRO-OPTIC DEVICE

(71) Applicant: LensVector Inc., San Jose, CA (US)

(72) Inventors: Tigran Galstian, Quebec (CA); Aram Bagramyan, Quebec (CA); Amir Tork, Quebec (CA); David Yoon, Queen Creek, CA (US); Sergei Yakovenko, Pleasanton, CA (US)

(73) Assignee: LENSVECTOR INC., Sunnyvale, CA (US)

( * ) Notice: Subject to any disclaimer, the term of this patent is extended or adjusted under 35 U.S.C. 154(b) by 0 days.

(21) Appl. No.: 15/308,984

(22) PCT Filed: May 4, 2015

(86) PCT No.: PCT/CA2015/050383
§ 371 (c)(1),
(2) Date: Nov. 4, 2016

(87) PCT Pub. No.: WO2015/168782
PCT Pub. Date: Nov. 12, 2015

(65) Prior Publication Data
US 2017/0075163 A1    Mar. 16, 2017

Related U.S. Application Data

(60) Provisional application No. 61/988,522, filed on May 5, 2014.

(51) Int. Cl.
*G02F 1/1341*    (2006.01)
*G02F 1/1333*    (2006.01)
(Continued)

(52) U.S. Cl.
CPC ...... *G02F 1/133377* (2013.01); *G02F 1/1337* (2013.01); *G02F 1/1341* (2013.01);
(Continued)

(58) Field of Classification Search
CPC .................. G02F 2001/13415; G02F 1/133351
See application file for complete search history.

(56) References Cited

U.S. PATENT DOCUMENTS

| 5,917,572 | A | 6/1999 | Kurauchi et al. |
| 7,362,404 | B2 | 4/2008 | Tadaki et al. |
| 2002/0051113 | A1* | 5/2002 | Kamiya .................. B32B 17/06 349/187 |
| 2007/0095468 | A1* | 5/2007 | Kim .................... B29C 47/0019 156/275.3 |
| 2007/0139333 | A1* | 6/2007 | Sato .................. G02F 1/134309 345/90 |

(Continued)

FOREIGN PATENT DOCUMENTS

| WO | WO 2009/153764 A2 | 12/2009 |
| WO | WO 2010/075627 A1 | 7/2010 |

OTHER PUBLICATIONS

PCT/CA2015/050383 ISR.
PCT/CA2015/050383 search strategy.
PCT/CA2015/050383 written opinion.

*Primary Examiner* — Alexander P Gross
(74) *Attorney, Agent, or Firm* — J-Tek Law PLLC; Jeffrey D. Tekanic; Scott T. Wakeman

(57) ABSTRACT

An electro-optic device having at least one liquid crystal cell for providing spatially variable control of light includes: a pair of opposed substrates sandwiching a liquid crystal layer therebetween; a pair of electrodes for applying an electric field therebetween, each electrode being deposited on a corresponding substrate; and a liquid crystal reservoir wall defining a lateral extent of the liquid crystal layer between the substrates. The reservoir wall includes: a first bottom
(Continued)

barrier deposited on a bottom one of the pair of substrates; and a second curable top barrier deposited on the top substrate outside the first barrier. The first barrier and second uncured barrier are configured to merge on contact to retain liquid crystal material inside the reservoir wall prior to curing the second barrier. Also, a method of wafer level manufacturing and assembly of a liquid crystal optical device.

22 Claims, 8 Drawing Sheets

(51) Int. Cl.
    *G02F 1/1337* (2006.01)
    *G02F 1/1339* (2006.01)
    *G02F 1/1343* (2006.01)

(52) U.S. Cl.
    CPC ...... *G02F 1/13394* (2013.01); *G02F 1/13439* (2013.01); *G02F 1/134309* (2013.01); *G02F 1/1333* (2013.01); *G02F 1/133351* (2013.01); *G02F 2001/13415* (2013.01)

(56) References Cited

U.S. PATENT DOCUMENTS

| | | | |
|---|---|---|---|
| 2010/0007807 A1* | 1/2010 | Galstian | G02F 1/13768 349/23 |
| 2011/0013132 A1* | 1/2011 | Chen | G02F 1/1339 349/155 |
| 2011/0109824 A1 | 5/2011 | Galstian | |
| 2011/0216257 A1* | 9/2011 | Galstian | C08J 3/28 349/33 |
| 2011/0255041 A1 | 10/2011 | Inoue | |
| 2012/0006466 A1* | 1/2012 | Galstian | G02F 1/1341 156/146 |
| 2013/0293823 A1* | 11/2013 | Yakura | G02F 1/133365 349/153 |

* cited by examiner

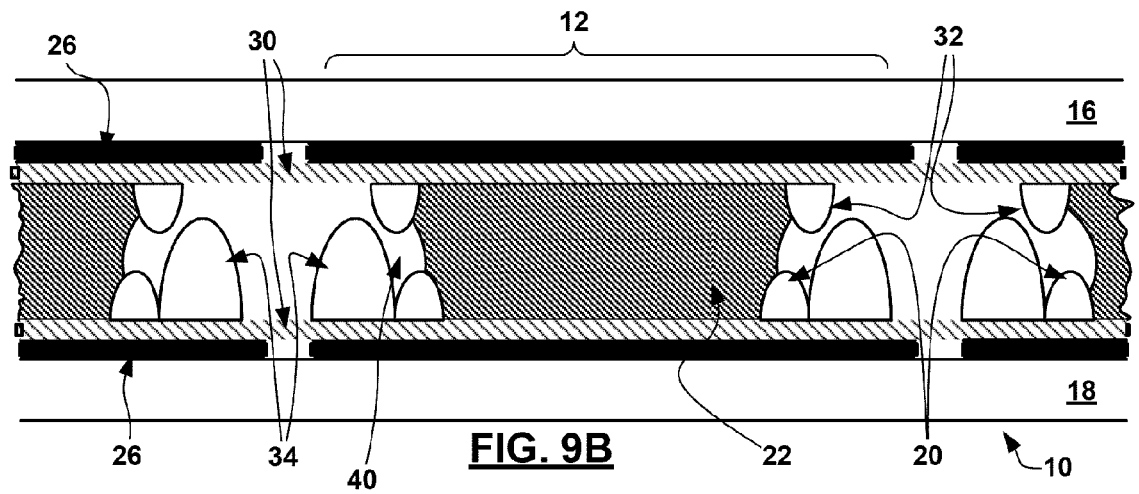
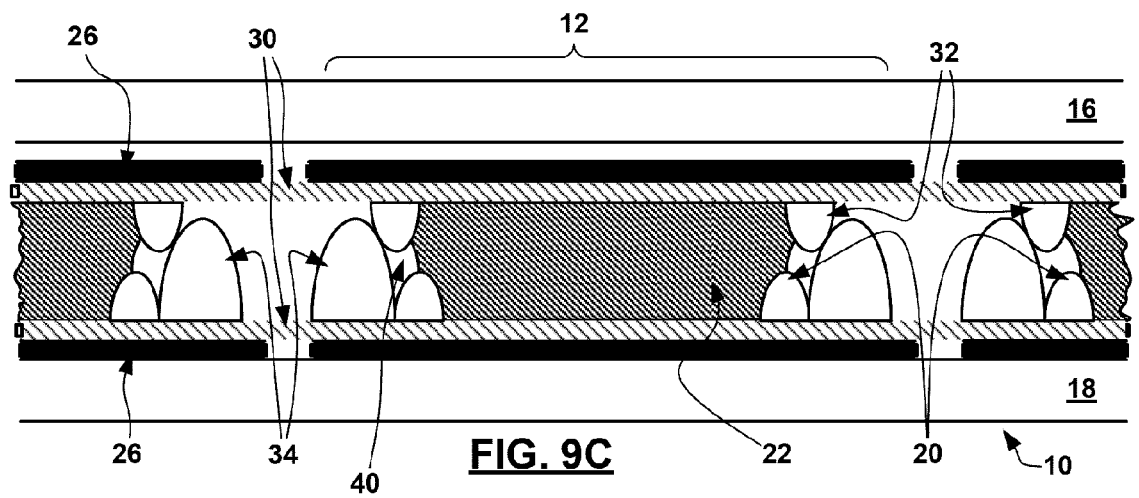
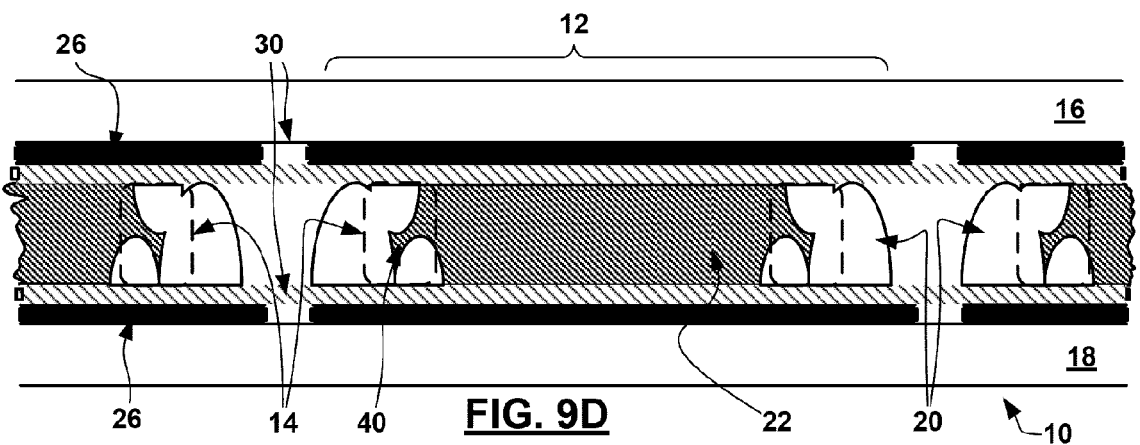

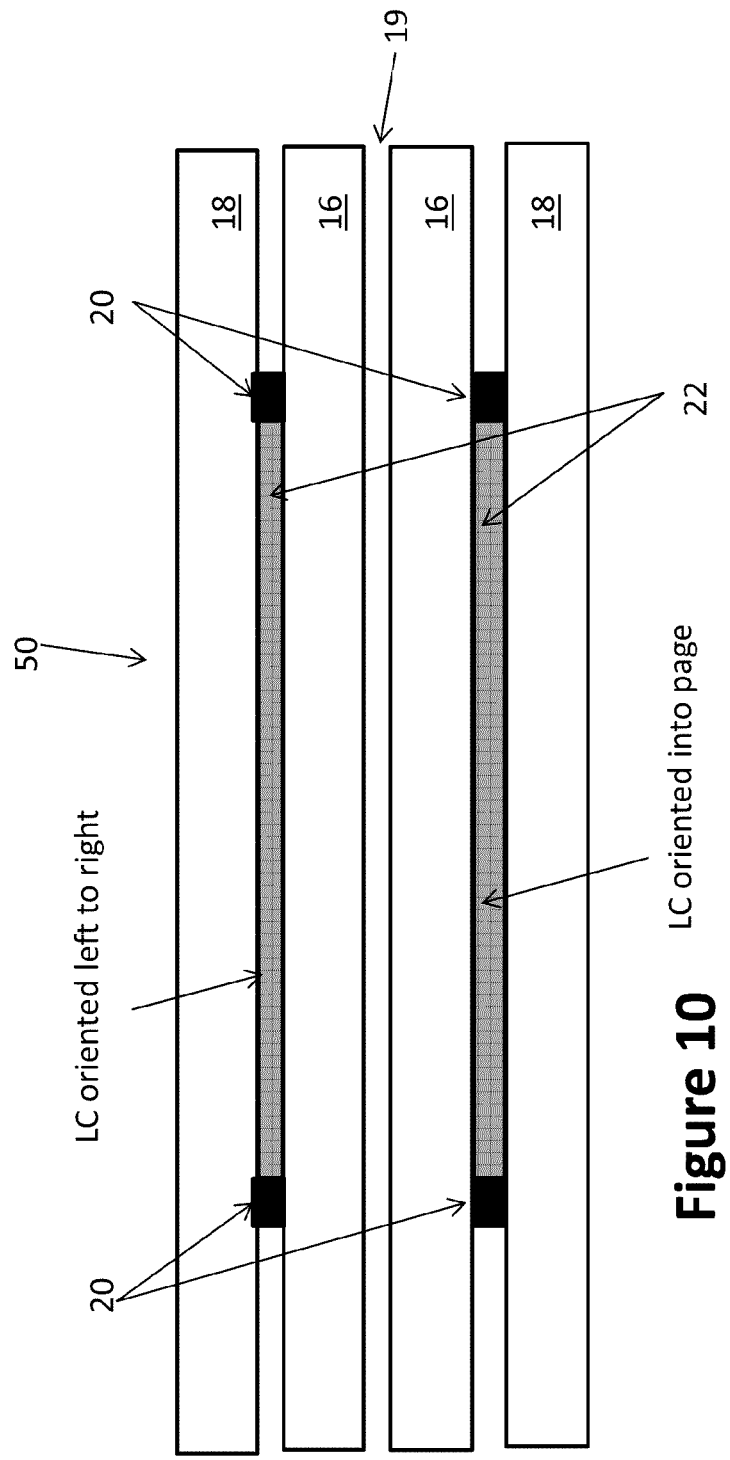

METHOD OF WAFER SCALE FABRICATION AND ASSEMBLY OF A LIQUID CRYSTAL ELECTRO-OPTIC DEVICE

This application is the U.S. National Stage of PCT/CA2015/050383, filed May 4, 2015, which claims priority from U.S. Provisional Patent Application Ser. No. 61/988,522 filed May 5, 2014, the entirety of which is incorporated herein by reference.

TECHNICAL FIELD

This invention relates to liquid crystal electro-optic devices, and in particular to fabrication and wafer level assembly of liquid crystal electro-optic devices.

BACKGROUND

Wafer level manufacturing processes are employed for example in manufacturing integrated circuits, image sensors, micro lens arrays, etc. Such parallel wafer level manufacturing uses a limited number of process steps to simultaneously obtain thousands of such devices, reducing their manufacturing cost. However, the fabrication and assembly of arrayed wafer level manufactured LCL devices remain as some of the most challenging process steps. Tailored approaches must be developed for each specific manufacturing process.

Electrically controllable (tunable), gradient index, liquid crystal lenses (TLCL's) are known in the art. As an example, see Applicant's international PCT patent application publication WO2009/153764 dated Dec. 23, 2009. Wafer-scale manufacturing of such TLCL's is known from Applicant's international PCT patent application publication WO2010/075627 dated Jul. 8, 2010.

Contamination of the liquid crystal material by resin material used to form reservoir walls is a problem during manufacturing. In the mentioned WO2010/075627, this problem is mitigated by the use of a pre-cured inner reservoir wall and an outer wall that is less cured, so as to allow for a good bond between substrates, while reducing the risk of liquid crystal contamination.

SUMMARY

In view of the above described state of the art, a need exists to develop an alternative way of wafer scale manufacturing of LCL optical devices which would allow simpler assembly and address contamination issues.

It has been discovered that a greater reservoir wall height can be achieved with simpler application of resin to the substrates by applying corresponding resin barriers to both top and bottom substrates. This can effectively double the resin wall height without requiring the initial application of larger resin barriers.

It has been discovered that presence of liquid crystal material can prevent good contact between resin and substrates forming a reservoir wall when the liquid crystal material spreads by wetting or surface tension on a substrate to a position where resin of the reservoir wall should connect between substrates. Reservoir wall integrity can be improved by using a liquid crystal containment barrier on a top substrate that prevents liquid crystal from spreading to where the reservoir wall material on the bottom substrate should make contact with the top substrate or reservoir wall material of the top substrate. This allows the formation of a reservoir wall without liquid crystal material interfering.

Therefore there is proposed a method of wafer level manufacturing limiting the spread of LC material to reduce possible contamination. To at least partially address the above mentioned problem, the use of a second or "complementary" reservoir wall is proposed. This complementary reservoir wall can be built using liquid (or gel) walls (at least a part of which is not cured completely). The role of this additional reservoir wall is to enable high height reservoirs, low contamination of the top substrate and good adhesion between the two substrates.

BRIEF DESCRIPTION OF THE DRAWINGS

The invention can be better understood by way of the following detailed description of embodiments of the proposed solution with reference to the appended drawings, in which:

FIG. 9B is a schematic diagram illustrating another wafer level LC reservoir fabrication step in the manufacturing of polarization dependent LC electro-optical devices in accordance with the proposed solution;

FIG. 9C is a schematic diagram illustrating a further wafer level LC reservoir fabrication step in the manufacturing of polarization dependent LC electro-optical devices in accordance with the proposed solution;

FIG. 9D is a schematic diagram illustrating yet another wafer level LC reservoir fabrication step in the manufacturing of polarization dependent LC electro-optical devices in accordance with the proposed solution; and FIG. 10 is a schematic diagram illustrating a side sectional view of a polarization independent LCL optical device in a wafer of such devices in accordance with the proposed solution, wherein similar features bear similar labels throughout the drawings. While the layer sequence described is of significance, reference to "top" and "bottom" qualifiers in the present specification is made solely with reference to the orientation of the drawings as presented in the application and do not imply any absolute spatial orientation.

DETAILED DESCRIPTION

Figure 1:
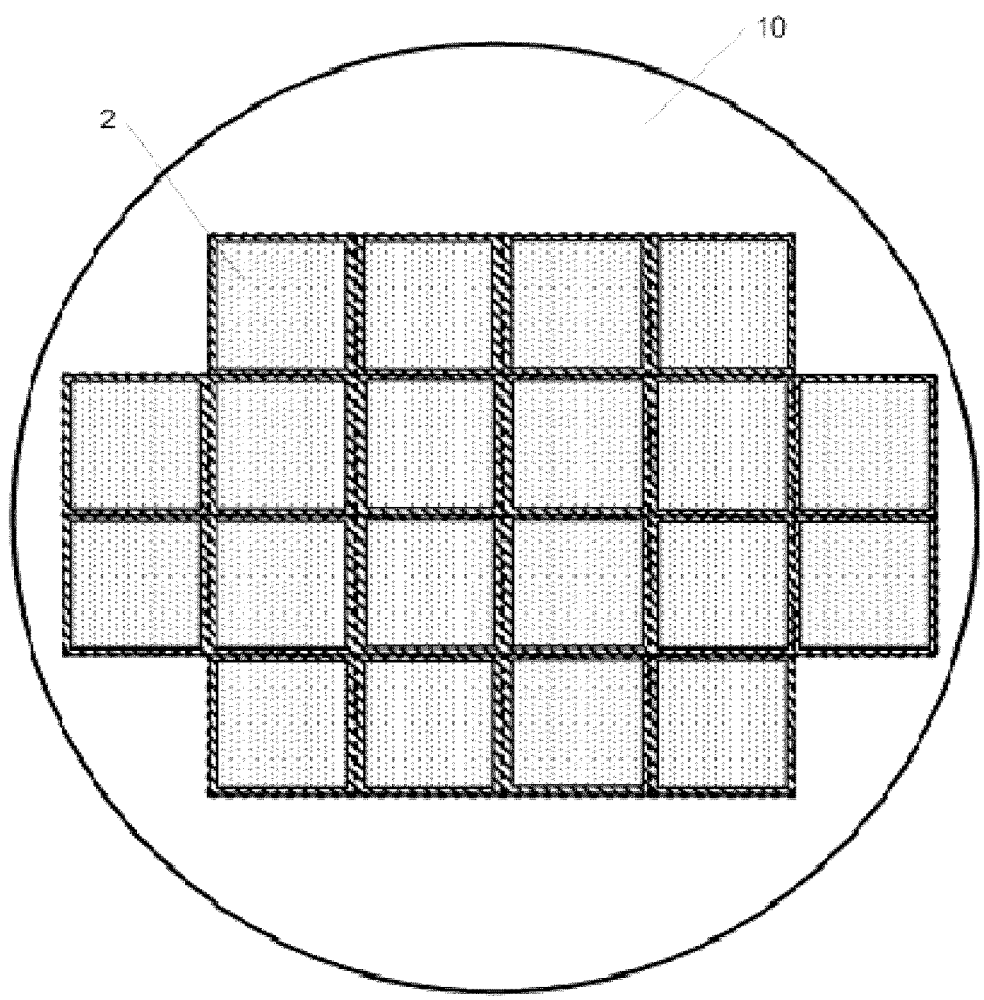
FIG. 1 is a schematic diagram showing a top view of a prior art wafer of liquid crystal optical devices during manufacture just prior to dicing.

The above mentioned problems can be solved according to the proposed solution wherein:

The manufacturing of LCL optical devices is delicate and particularly more complicated than the manufacturing of conventional all-solid integrated circuits. With reference to FIG. 1, LCL wafers 10 are 2D arrays of thousands of LCL optical devices 12, which, by the liquid nature of the LC layer(s) employed, necessarily contain numerous liquid reservoirs. Within the context of this patent application, "wafer" may mean any kind of substrate (e.g. glass, silicon, sapphire) of any shape (e.g. round, rectangular, etc).

To simplify the description herein, the LC material is birefringent and the figures illustrate polarization dependent LCL optical devices (one layer of LC in a single wafer). For example, with reference to FIG. 2, each final (to be diced out from the wafer) LCL optical device 12 includes substrates 16, 18, and LC reservoir 22 containing working liquid(s) being delimited by an (adhesive) container reservoir wall 20 optionally containing spacers (not shown). An optional material 24 (also known as "backfill") may be employed externally with respect to LC reservoirs 22, between the reservoir walls 20, to provide (when needed) mechanical support for singulation (dicing) of individual LC optical devices 12 from the wafer 10.

Figure 2:
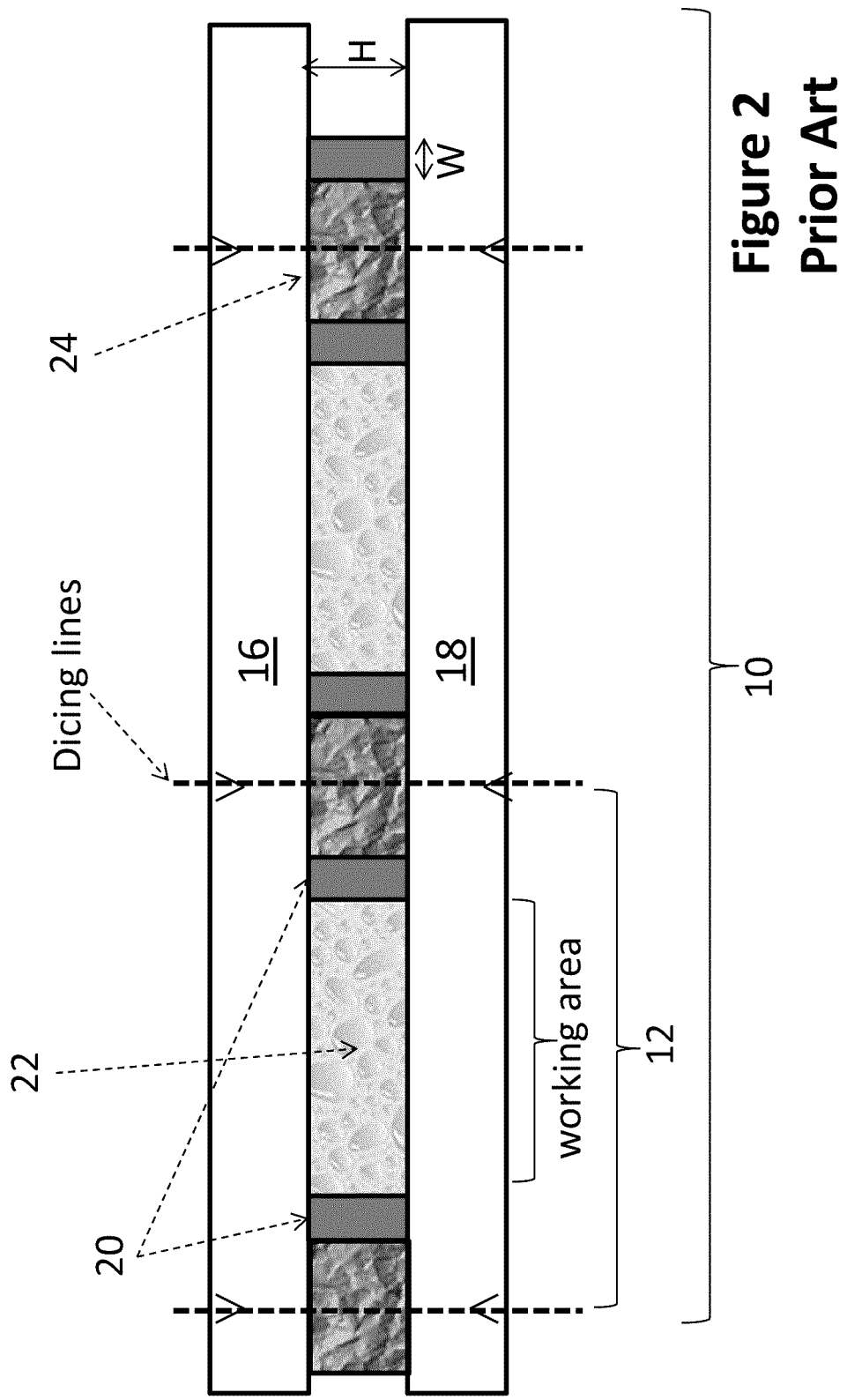
FIG. 2 is a schematic diagram showing a cross-sectional view through prior art wafer level manufactured liquid crystal optical devices in a wafer having liquid crystal filled reservoirs.
Figure 3:
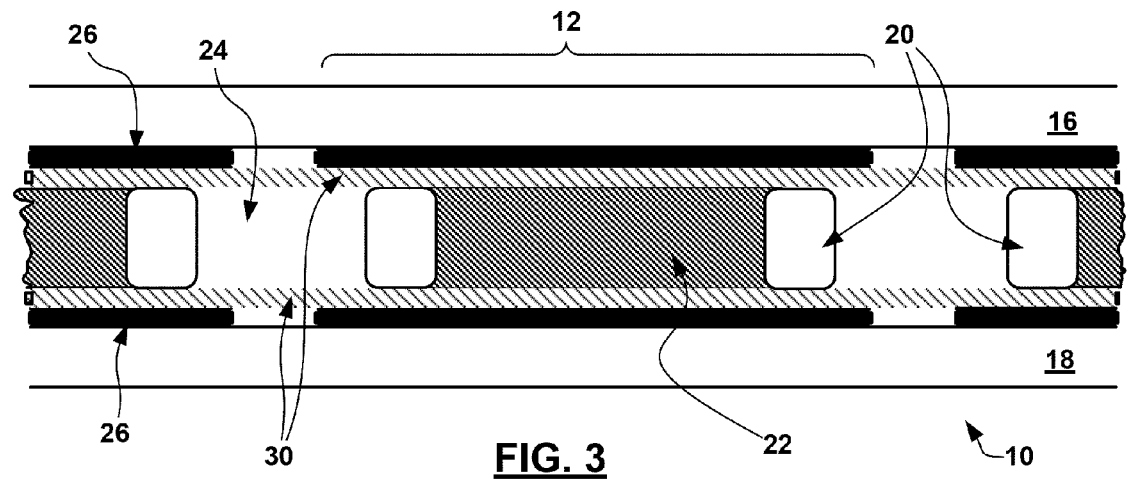
FIG. 3 is a schematic diagram illustrating a polarization dependent layered wafer structure including alignment layers in accordance with the proposed solution.

With respect to LCL electro-optic devices, the layered geometry schematically illustrated in FIG. 2 is simplified by omitting additional layers specific to the LC optical device. The polarization dependent orientation of LC layers is defined by corresponding alignment layers sandwiching each LC layer. FIG. 3 is a schematic illustration of a polarization dependent layered wafer structure including alignment layers 30 sandwiching an LC layer forming LC reservoirs 22. Alignment layers 30 define a predominant LC molecular orientation of LC material molecular axes in a ground state. For example, without limiting the invention thereto, polyimide films can be employed to provide alignment layers for nematic LC materials. An important property of such alignment layer materials is their wetability by LC materials. Wetability is the ability of LC material molecules to intermingle with alignment layer molecules, at the molecular level, in order for a ground state molecular orientation to be imparted to the LC layer for the operation of the polarization dependent LC electro-optic device.

The invention is not limited to the above mentioned polarization dependent LC electro-optic devices. At least two such LCL optical devices 12, stacked with cross-oriented alignment layers 30, are employed to provide polarization independent LCL optical devices 12 for operation in ambient (lamp, Sun) light. FIG. 10 schematically illustrates a layered structure of a singulated wafer level manufactured polarization independent LCL electro-optic device. For example, two wafers having arrays of polarization dependent LCL electro-optic devices 12 may be assembled together in a stack for example by means of a thin layer of adhesive 19 using cross-oriented liquid crystal layers $LC_\parallel$ and $LC_\perp$ to act on two orthogonal polarizations of incident light. The entire assembled layered structure can be cleaved into individual polarization independent LCL electro-optic devices 50.

The (adhesive) material of the container reservoir wall 20 must be chosen carefully to perform several (key) functions such as: adhesion between substrates, screen printing, non-contamination of working liquids in the reservoir 22, UV curability, etc. The reservoir wall material is preferably a UV curable (cured) resin, but is not restricted to such a material. It can be applied to the substrates by silk-screen printing, direct dispensing or any suitable technique.

From a volumetric perspective, it is undesirable to dispense too little LC material in the reservoirs 22 which may lead to empty gaps, concave deformation of substrates, or bubbles within the LC reservoir area 22. Gaps or bubbles cannot be tolerated in the working area within the optical aperture of individual LC electro-optic device 12. In practice however, there is a risk of formation of such gaps/bubbles, given that neither the injected liquid's volume can be dispensed perfectly precise nor the reservoir's volume can be manufactured perfectly precise.

At least a part of the reservoir wall 20 may be made flexible (gel or liquid) and may be "adjusted" to the volume of injected working liquid before being solidified, for example by UV polymerization as follows:

Briefly, wafer level manufacturing steps in fabricating (see, e.g. FIG. 3) polarization dependent LC electro-optic devices 12 include providing a substrate 18 (16), coating or depositing typically a transparent electrode (uniform or patterned) layer 26, for example made of Indium Tin Oxide (ITO), and applying alignment layer 30 material on top of the electrode layer 26. The (entire) alignment layer 30 on a wafer 10 is imparted a predominant alignment direction, for example by rubbing in a particular direction the alignment layer surface which is to come in contact with the LC material in the LC reservoir 22 of the LC electro-optic device 12. These layers are not illustrated in the following description. The control electrodes may also be covered by various dielectric or semiconductor layers for electric field control and optical functions.

Figure 4A:
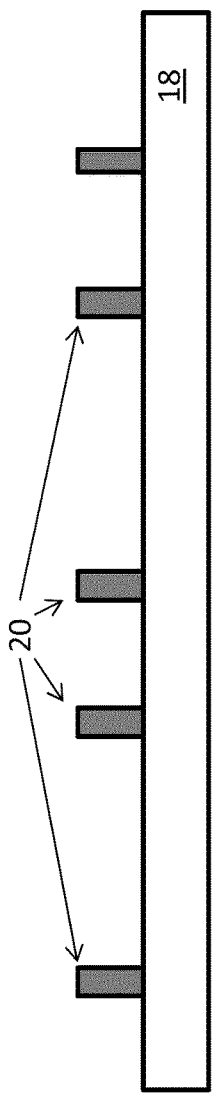
FIGS. 4A, 4B, 4C and 4D are schematic diagrams illustrating prior art LC reservoir formation employing adaptive reservoir walls and variable vacuum.

FIG. 4A schematically illustrates flexible reservoir wall 20 material, liquid or gel (adhesive), printed (or dispensed) on bottom substrate 18 for an initial "projected" reservoir 22 volume, $V_{CO}$. Typically a bead of adhesive material impermeable to the LC material is printed on the alignment layer 30. Optionally the reservoir wall material contains spacers (14) of specified diameter to control the spacing between the substrates 16, 18. The wall might also be etched or otherwise fabricated. The alignment layers 30 may also be locally printed.

Figure 4B:
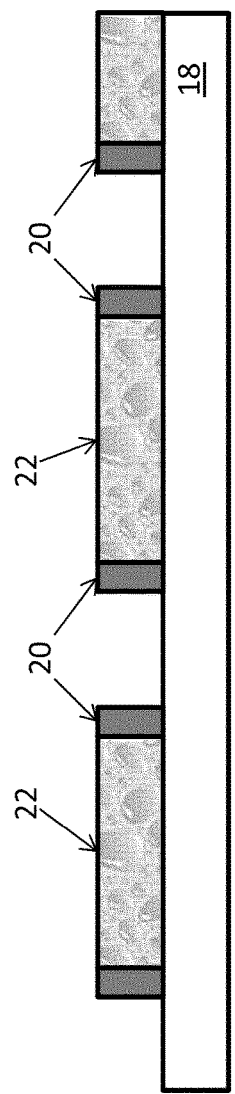

FIG. 4B schematically illustrates working liquid having a predetermined volume dispensed (injected) into reservoirs 22. For example, for LCL optical devices, the working liquid can include nematic LC material. It is understood that FIG. 4B is highly schematic.

Figure 4C:
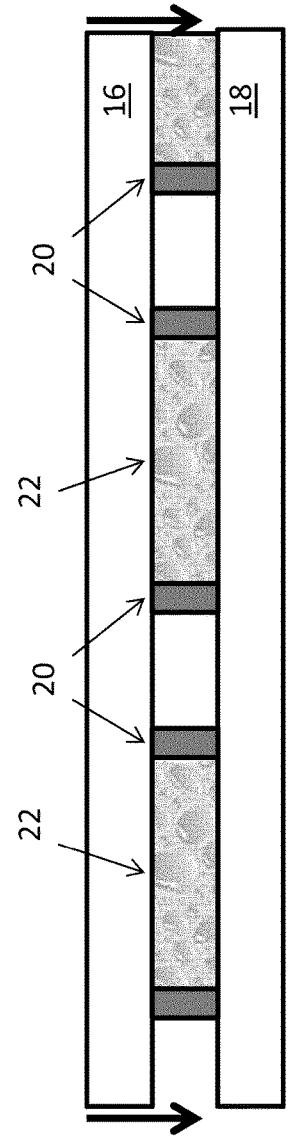

The obtained wafer level manufactured structure is placed in a vacuum (or in an environment of a condensable vapor of material that is compatible with the liquid crystal material, or in an environment of a material dissolvable in liquid crystal material). FIG. 4C schematically illustrates another "top" substrate 16 added to close or seal the polarization dependent LC optical devices 12 on the entire wafer 10. For example, by pressing the top substrate 16 on the layered structure of FIG. 4B, contact is made between the top substrate 16 and the reservoir wall 20 material. When spacers are employed (apart or within the LC or flexible adhesive material), the spacers limit the height H (illustrated in FIG. 2) of the reservoirs 22. Alternatively, the height may be ensured by the solidified (partly or completely) wall itself. Some material gaps/bubbles may form in the working liquid area (within the reservoirs 22), which cannot be pressed out.

While the pressure on the top substrate 16 is maintained, increasing external pressure with respect to the working liquid reservoirs 22 forces the flexible (liquid/gel) walls 20 to "embrace" the working liquid and to eliminate empty gaps/bubbles. The new volume of the reservoirs 22 equals the dispensed volume of the working liquid. Then, the reservoir walls 20 can be cured. For example, if the reservoir wall material is UV curable, the entire wafer 10 is exposed to a dose of UV radiation. In some cases, the working liquid (e.g. the LC material) may be protected by a mask during this exposure.

Figure 4D:
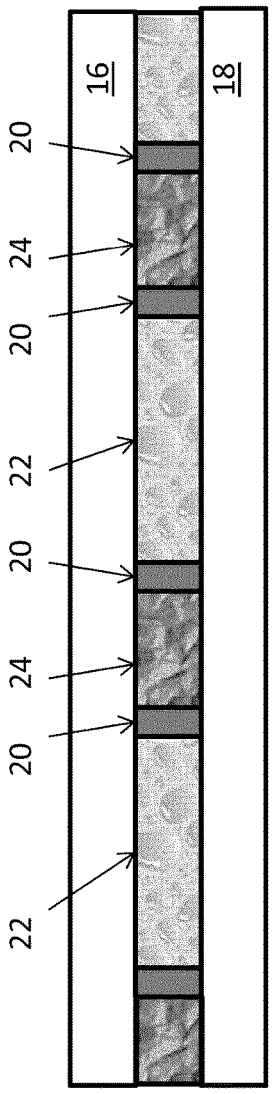

FIG. 4D schematically illustrates optional backfill material 24 between reservoirs 22, the material 24 being injected and cured. For example, the layered structure of FIG. 4C, with the cured reservoir walls 20, is exposed to vacuum in a chamber; uncured backfill material is provided at the periphery of the wafer 10 and the uncured backfill material seeps in between reservoir walls 20 as chamber pressure is increased. The backfill material can then be cured.

As schematically illustrated in FIG. 1, following such a manufacturing process for polarization dependent LCL electro-optic device arrays on the wafer, thousands of LCL electro-optic devices 12 are obtained on the same wafer 10, each having corresponding reservoir 22 defined by reservoir walls 20. Further manipulations can be performed including singulation (dicing) of individual LC optical devices 12.

The above described single flexible wall approach has significant drawbacks particularly related to high aspect ratio R=H/W reservoir walls 20 (see FIG. 2). One drawback is that it is very difficult to screen print flexible reservoir walls 20 of large height H. Sequential printing and curing of the reservoir wall material on the same substrate 18 can lead to uneven wall height and thus (uneven) spacing between substrates 16, 18. Printed reservoir wall materials and dispensed working liquid materials have surface tension properties which govern such materials during wafer level fabrication and needs consideration. As well the wettability property of the LC material plays a role in wafer level manufacture.

Figure 5A:
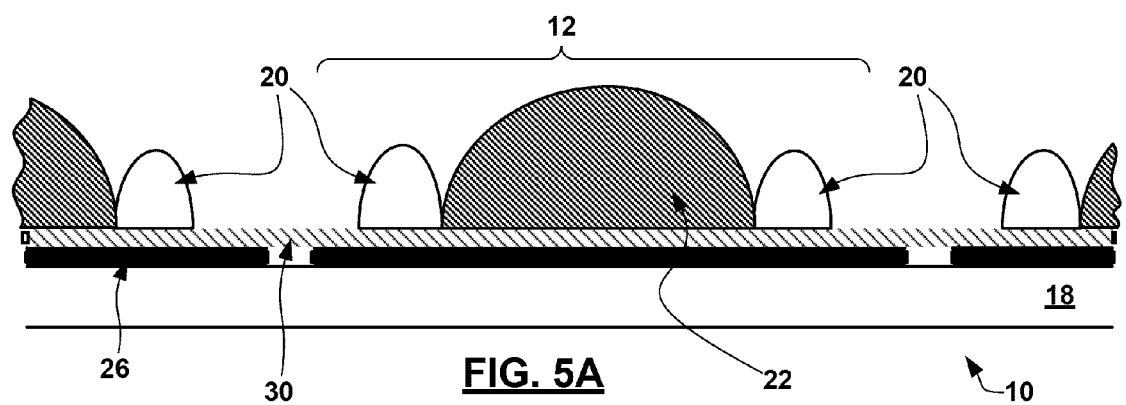
FIG. 5A is a schematic diagram illustrating wafer level LC reservoir fabrication in the manufacturing of polarization dependent LC electro-optical devices.

FIG. 5A illustrates further details with respect to wafer level LC reservoir fabrication in the manufacturing of polarization dependent LC electro-optical devices 12 corresponding to FIG. 4B. As the drop of LC material is dispensed within the printed reservoir wall 20, due to the high wettability of the alignment layer 30 the LC material drop immediately expands within the reservoir wall 20 forming a meniscus within the reservoir 22. Even if LC material drops are dispensed accurately, the surface tension of the LC material causes the LC material meniscus to bulge out well above the height of the reservoir wall 20 bead.

Figure 5B:
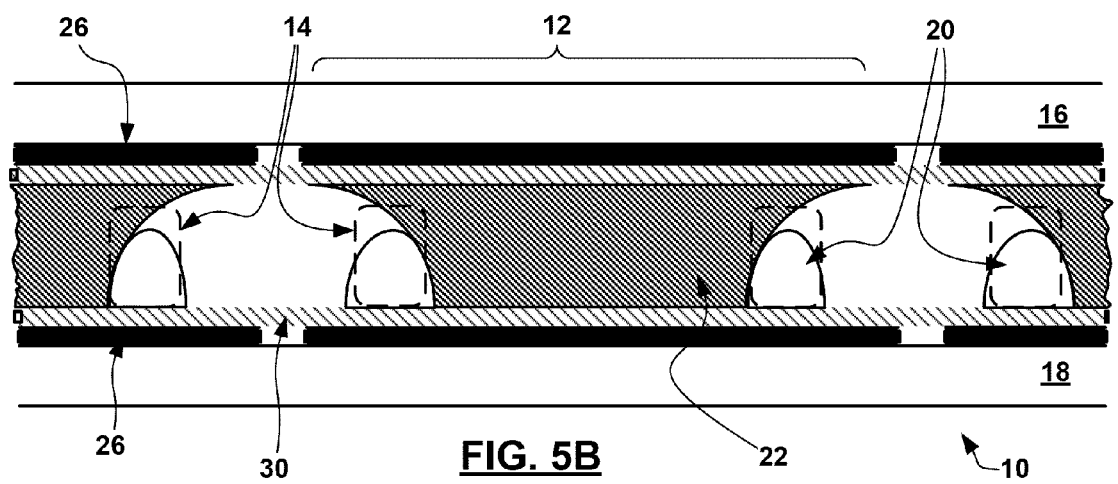
FIG. 5B is a schematic diagram illustrating another wafer level LC reservoir fabrication step in the manufacturing of polarization dependent LC electro-optical devices.

As described hereinabove, subsequent wafer level LC reservoir fabrication steps include applying top substrate 16 having an electrode layer 26 and alignment layer 30 thereon to sandwich the LC material and thus produce LC devices 12 on the wafer 10. Pressing the top substrate 16 on the previously obtained structure to obtain the layered structure as illustrated in FIG. 4C, may result in the wetting of the internal surface of the top substrate 16, with the alignment layer 30 thereon, before contact is made between the top substrate 16 and the reservoir wall bead 20 as illustrated in FIG. 5B. LC material on the surface of the top alignment layer 30 opposite the reservoir wall bead 20 can compromise the adhesion of the reservoir wall material to the top substrate 16 and can contaminate outer reservoir areas of the wafer 10. If the wall bead 20 material is only partially cured, LC material trapped between the bead 20 and the top substrate 16 may mix with the bead 20 material, prevent its curing and compromise device integrity.

In order to more accurately define each LC reservoir 22, providing the bottom reservoir wall barrier 20 on the bottom substrate 18 can include depositing spacers (not shown) to fix the spacing between top 16 and bottom 18 substrates, and can include curing the bottom barrier 20 to prevent movement thereof as the top substrate 16 is applied. This pre-curing of the bottom barrier 20 can also better define the aperture of each LCL optical-device 12.

Taking into account variability in dispensing LC material drops (FIG. 4B), an amount of LC material is dispensed for each LC reservoir 22 to ensure adequate filing of the LC reservoir 22 even by the smallest drop dispensed in the range in order to reduce LC material gaps/bubbles. Therefore, an amount of LC material will almost always overspill the bottom barrier 20. Unaddressed, this LC material overspill can lead to potential contamination. Underfilling leads to gaps/bubbles that can lead to substrate deformation and is likewise undesirable.

Figure 6A:
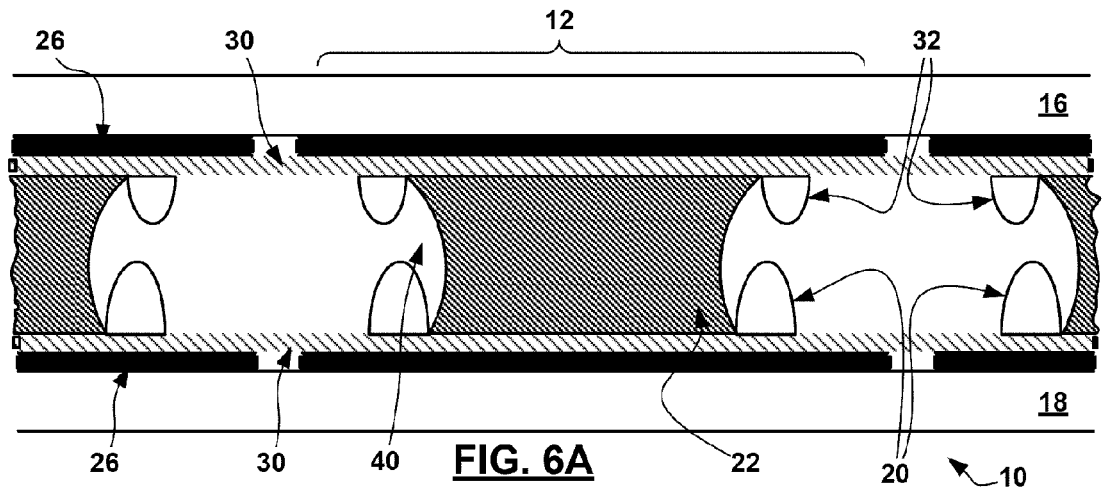
FIG. 6A is a schematic diagram illustrating a wafer level LC reservoir fabrication step in the manufacturing of polarization dependent LC electro-optical devices in accordance with an embodiment of the proposed solution.

In accordance with a first embodiment of the proposed solution, after the top alignment layer 30 is wafer level fabricated (spin coated or printed and then rubbed) on the top substrate 16, a top uncured barrier bead 32 of reservoir wall material is applied to the top alignment layer 30, for example by employing (screen) printing techniques. FIG. 6A illustrates the top substrate 16 with the top barrier bead 32 thereon having just made contact with the LC material drops (compare with FIG. 4C). The wettability of the top alignment layer 30 breaks the surface tension of the LC material drops and the LC material expands over the surface of the top alignment layer 30. However, in this embodiment the expansion of the LC material over the top alignment layer 30 stops at the top barrier bead 32. A circular (annular) LC material meniscus persists.

The top barrier 32 is sized in terms of extent and in terms of the amount of reservoir wall material deposited (with predetermined height $H_T$ and width $W_T$) to: limit the spread of the LC material over the surface of the top alignment layer 30 and to make good physical contact the with the bottom barrier 20 (also having a corresponding predetermined height $H_B$ and width $W_B$). The bottom barrier bead 20 and top barrier bead 32 need not have the same perimeter; an offset can be tolerated as for example illustrated in FIGS. 6A, 6B and 6C wherein the top barrier bead 32 has a slightly larger perimeter (diameter). Without limiting the invention thereto, the bottom barrier 20 and the top barrier 32 have similar material composition of reservoir wall material, however the top barrier bead 32 may not include spacers.

Figure 6B:
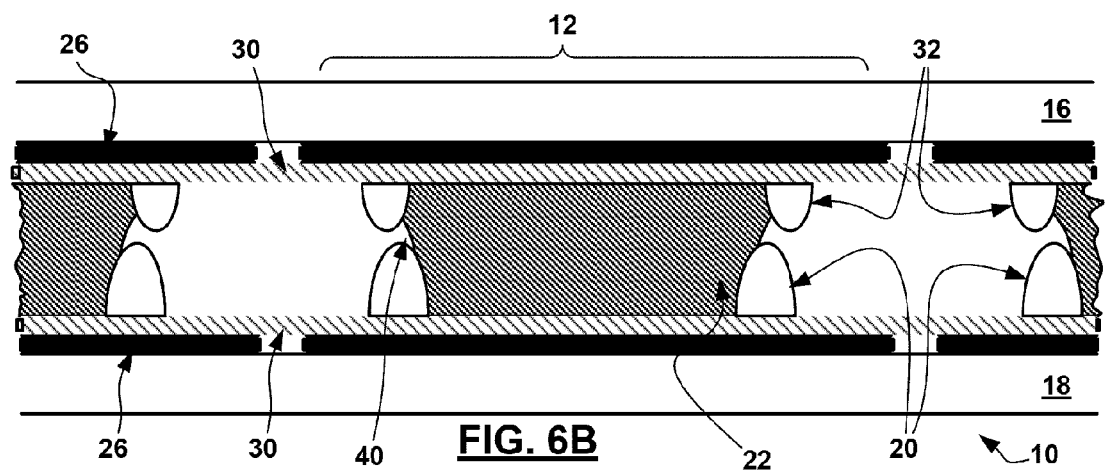
FIG. 6B is a schematic diagram illustrating another wafer level LC reservoir fabrication step in the manufacturing of polarization dependent LC electro-optical devices in accordance with the proposed solution.
Figure 6C:
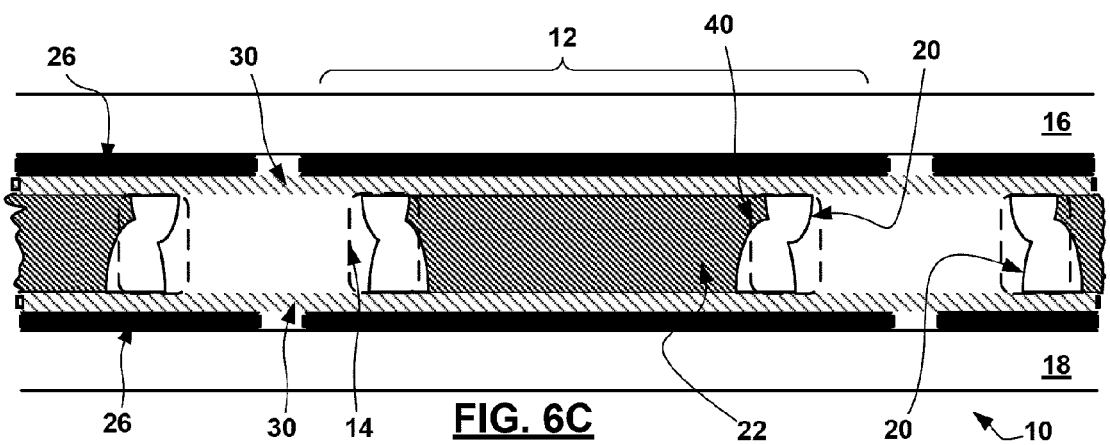
FIG. 6C is a schematic diagram illustrating a further wafer level LC reservoir fabrication step in the manufacturing of polarization dependent LC electro-optical devices in accordance with the proposed solution.

Even as the largest drop of LC material dispensed is sandwiched between the top 16 and bottom 18 substrates, for example as illustrated in FIG. 6B, extra LC material squeezes between the bottom barrier 20 and the top barrier 32 towards a pocket 40 between the top 32 and bottom 20 barriers as illustrated in FIG. 6C. Pocket 40 is intended to catch an amount of LC material overspill. Sufficient reservoir wall material volume is provided in the barriers to ensure that the bottom 20 and top 32 barriers touch and merge first before the pocket 40 is filled with LC material as illustrated in FIGS. 6B and 6C. The merged top barrier bead 32 and bottom barrier bead 20 form the overall reservoir wall 20.

While top barrier bead 32 and pocket 40 provide a reduction in LC material overspill, LC material gaps/bubbles may still form. The printing and pre-curing of the bottom barrier bead 20 better defines the LCL optical-device aperture, while the offset printing of the top barrier bead 32 provides the pocket 40 outside the LCL optical device aperture. Small LC material gaps/bubbles can be tolerated outside the aperture, however it may be appreciated that LC material gaps/bubbles may undesirably shift after manufacture and potentially affect calibration of the device 12. In order to further reduce the negative effects of LC material gaps/bubbles, the assembly process of the wafer level structure illustrated in FIG. 6C can be done in a vacuum to adjust the uncured top barrier bead 32 to embrace the LC material dispensed squeezing out the LC material gaps/bubbles.

As a subsequent step in wafer level manufacturing the LC reservoirs 22 of the LC electro-optic devices 12, the merged bottom barrier 20 and top barrier 32 material is cured to form the reservoir wall 20. FIG. 6C schematically illustrates wafer level manufactured LC reservoir(s) 22 as described herein. Shown in dashed line are spacers 14 defining the height H of the LC reservoir 22.

Figure 7:
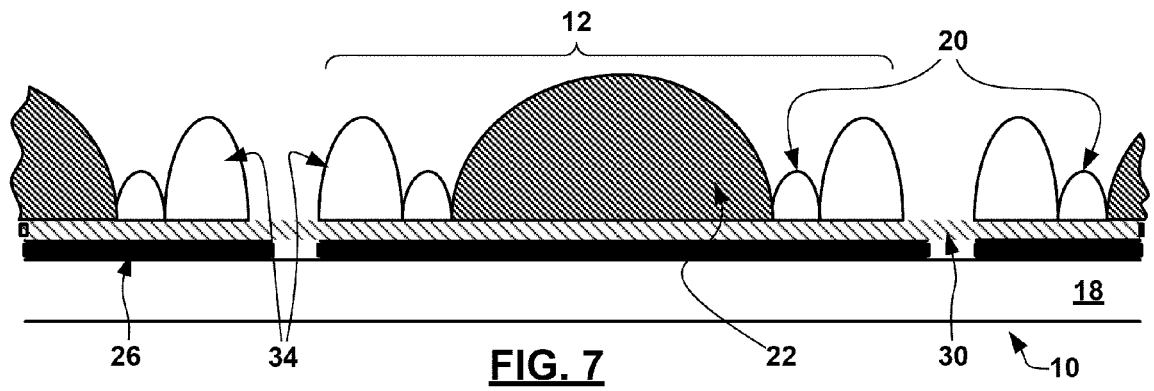
FIG. 7 is a schematic diagram illustrating polarization dependent LCL devices manufactured in accordance with another embodiment of the proposed solution.

In accordance with a preferred embodiment of the proposed solution, a second bottom barrier bead 34 is (screen) printed on the bottom alignment layer 30 just outside the perimeter (or partially overlapping) of the first bottom barrier 20 (which is partially or completely cured) as illustrated in FIG. 7, however this second barrier 34, in order to catch the LC material overspill and/or reduce LC material gaps/bubbles, is left uncured until after the top substrate 16 is properly positioned on top. For example and without limitation, the first bottom barrier bead can be 32+/−3 µm in size, while the second bottom barrier bead can be 45+/−3 µm in size.

Figure 8:
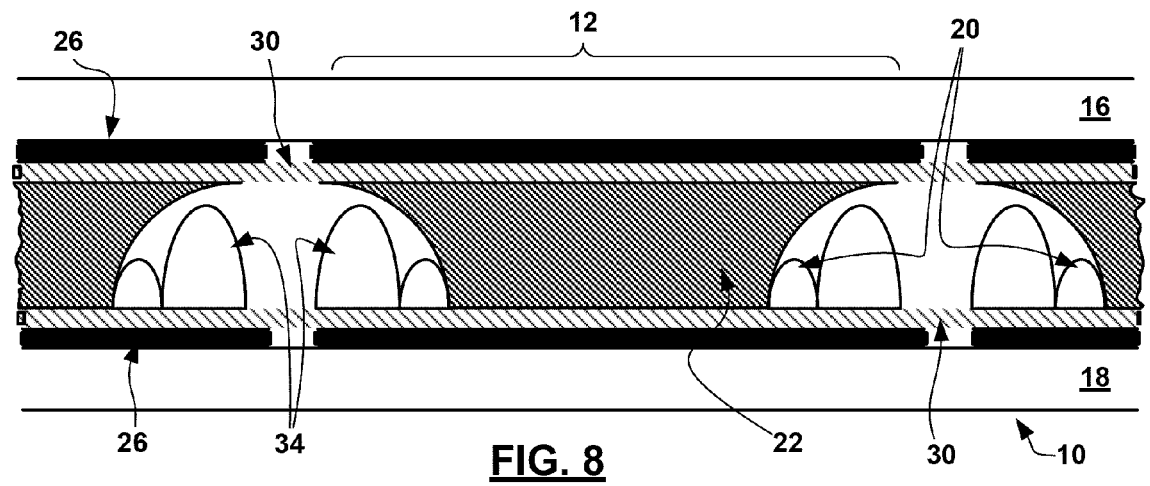
FIG. 8 is a schematic diagram illustrating LC material overspill in wafer level LC reservoir fabrication of polarization dependent LC electro-optical devices.

It has been discovered that the second bottom barrier 34 may be insufficient to prevent LC material contamination. Due to the meniscus of the LC material drop extending higher than the meniscus of the second bottom barrier (34), the LC material drop meniscus is the first one to touch the top alignment layer 30 as the top substrate 16 is applied and before contact is made between the top alignment layer 30 and the uncured second bottom barrier 34. Due to the high wettability of the LC material on the top alignment layer 30, the LC material meniscus breaks on contact and LC material may undesirably spread out to cover the surface of the top alignment layer 30 beyond the extent of the second bottom barrier 34 as illustrated in FIG. 8.

Figure 9A:
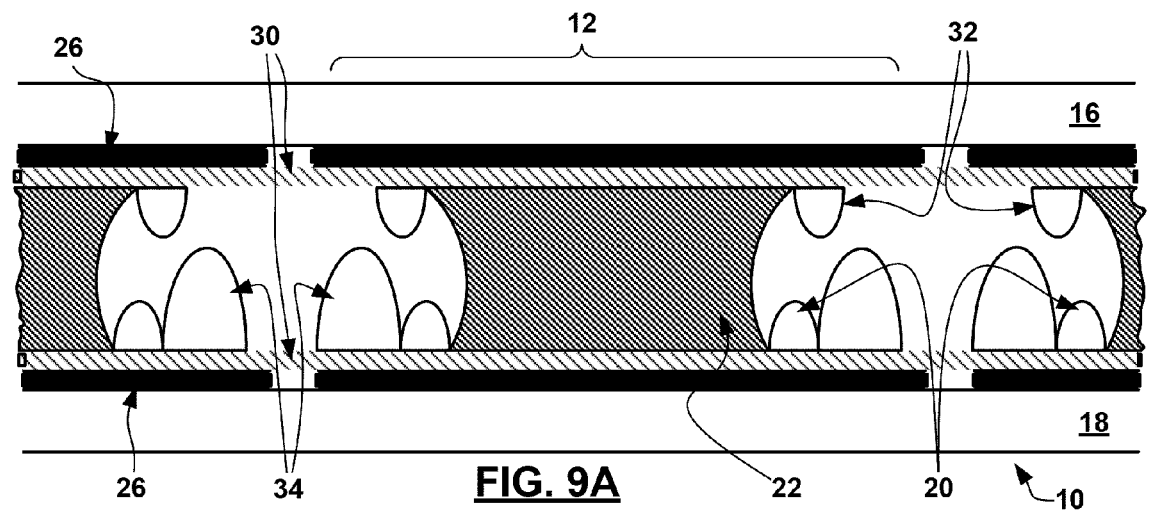
FIG. 9A is a schematic diagram illustrating a wafer level LC reservoir fabrication step in the manufacturing of polarization dependent LC electro-optical devices in accordance with the proposed solution.

In accordance with the proposed solution, after the top alignment layer 30 is wafer level fabricated, a third top uncured barrier bead 32 is applied to the top alignment layer 30, by employing various (e.g. screen) printing techniques, for example just inside the perimeter of the second bottom barrier bead 34, or overlapping with the second bottom barrier bead 34. With reference to FIG. 9A, the third top barrier 32 is sized in terms of extent and in terms of the amount of reservoir wall material deposition (having a corresponding predetermined height H and width W) to: limit the spread of the LC material over the surface of the top alignment layer 30 and to make good physical contact the with the second bottom barrier 34. Typically, but not necessarily, the second bottom barrier 34 and the third top barrier 32 have similar material composition. Even as the largest drop of LC material which can be dispensed is sandwiched between the top 16 and bottom 18 substrates, extra LC material squeezes between the first bottom barrier 20 and the third top barrier 32 towards a pocket 40 between the first 20 and second 34 bottom barriers as illustrated in FIG. 9B. Sufficient volume is provided between the barriers to ensure that the second 34 and third 32 barriers touch and merge first before the pocket 40 is filled with LC material as illustrated in FIG. 9C.

When done in a vacuum or low pressure environment, the closed cell achieved in FIG. 9C will be entirely filled with liquid crystal without trapping gas to form bubbles or gas pockets (gaps). Optionally the space between the cells can then be subjected to atmospheric pressure, pockets 40 can optionally be filled by barrier material with the inward biasing of the barrier material by the atmospheric pressure.

As a last step in wafer level manufacturing the LC reservoirs 22 of the LC electro-optic devices 12, the merged second bottom barrier 34 and third top barrier 32 material is cured, for example by UV exposure or the like. FIG. 9D schematically illustrates a wafer level manufactured LC reservoir as described herein. The cured first 20 and curable second 34 bottom barriers can provide, at least in part, mechanical support for subsequent singulation/dicing.

The barriers can be flexible (at least during manufacturing) so as to allow for the liquid crystal to make full contact with the barriers without unduly stressing the substrates as the substrates are bonded to one another. While in some embodiments the uncured barriers are joined and then cured to form the cell walls, it will be appreciated that barriers that are cured or otherwise formed can contact each other to form a seal, and the mechanical joining of the substrates can be provided by a material other than the barriers, such as for example the back-fill material.

In either the first or second embodiments, the wafers 10 of FIGS. 6C and 9D can be further processed to inject backfill material (FIG. 4D) between the LC reservoirs 22. Subsequent wafer level assembly includes joining two wafers 10 with cross-oriented alignment layers 30 with a transparent adhesive 19 to produce polarization independent electro-optic devices 50 as illustrated in FIG. 10.

While extensive reference has been made in the above description to LC lens optical devices, the invention is not limited thereto, for example the above can equally be applied to electro-optical devices providing spatially variable control of light including shutters, diffusers, mirrors and beam steering devices. For certainty, in the case of some electro-optic devices not all electrodes 16/18 need to be transparent.

In case LC reservoirs are spaced far apart from each other, simultaneously with the beads 32 and 34, additional islands of the same adhesive may be fabricated to support even spacing between the substrates 16 and 18.

While the invention has been shown and described with reference to preferred embodiments thereof, it will be recognized by those skilled in the art that various changes in form and detail may be made therein without departing from the spirit and scope of the invention as defined by the appended claims.

What is claimed is:
1. A method of manufacture of liquid crystal electro-optic devices, the method comprising:
preparing top and bottom liquid crystal cell substrates;
forming a bottom barrier on said bottom substrate, said bottom barrier having a bottom perimeter;

forming a top barrier on said top substrate, said top barrier having a top perimeter different than said bottom perimeter;

dispensing a predetermined quantity of liquid crystal material on said bottom substrate within said bottom barrier; and lowering said top substrate until said top barrier and said bottom barrier merge or seal together to form a closed liquid crystal reservoir wall with the liquid crystal pressing against said wall, said lowering being performed in a vacuum or a condensable vapor environment to prevent trapping of gas in a liquid crystal cell defined by said reservoir wall and said substrates, wherein at least one of said top or bottom barriers comprises multiple barriers horizontally interleaved with respect to the other of said top or bottom barriers respectively, and wherein said bottom barrier comprises a cured inner bottom barrier and an uncured, curable outer bottom barrier.

2. The method of manufacture of liquid crystal electro-optic devices as claimed in claim 1, further comprising:

contacting said liquid crystal material with said top substrate, wherein said liquid crystal material wets said top substrate until contacting and being retained by said top barrier.

3. The method of manufacture of liquid crystal electro-optic devices as claimed in claim 1, wherein said substrates are prepared for an array of devices to be manufactured by wafer-scale fabrication, wherein said bottom and said top substrates are provided with corresponding arrays of said bottom barriers and said top barriers, said dispensing is performed for each one of said bottom barriers.

4. The method of manufacture of liquid crystal electro-optic devices as claimed in claim 3, further comprising singulating individual devices from a resulting wafer comprising said top and bottom substrates.

5. The method of manufacture of liquid crystal electro-optic devices as claimed in claim 4, further comprising filling a space between said reservoir walls prior to said singulating.

6. The method of manufacture of liquid crystal electro-optic devices as claimed in claim 1, wherein said top barrier is curable, further comprising a step of curing said outer bottom barrier and said top barrier following said lowering.

7. The method of manufacture of liquid crystal electro-optic devices as claimed in claim 1, wherein at least said lowering is performed in a vacuum environment.

8. The method of manufacture of liquid crystal electro-optic devices as claimed in claim 1, wherein said device is a tunable lens or a beam steering device, said substrates being prepared with electrodes arranged to apply a spatially non-uniform electric field in said liquid crystal material, and an alignment layer on a surface of said opposed substrates sandwiching said liquid crystal layer therebetween, said alignment layers defining a predominant orientation direction for liquid crystal molecules of said liquid crystal layer.

9. The method of manufacture of liquid crystal electro-optic devices as claimed in claim 8, wherein said device is a lens and said electrodes comprise a hole-patterned electrode, a transparent planar electrode and a highly resistive layer associated with said hole-patterned electrode.

10. The method of manufacture of liquid crystal electro-optic devices as claimed in claim 1, wherein said devices each comprise two liquid crystal cells, wherein a first one of said cells has liquid crystal oriented in a first linear direction, and a second one of said cells has liquid crystal oriented in a second linear direction orthogonal to said first linear direction, said device acting on both linear polarizations of light.

11. The method of manufacture of liquid crystal electro-optic devices as claimed in claim 1, further comprising depositing spacers on at least one of said substrates to define a thickness of each liquid crystal cells.

12. The method of manufacture of liquid crystal electro-optic devices as claimed in claim 1, wherein said bottom barrier comprises a different number of barriers than said top barrier.

13. The method of manufacture of liquid crystal electro-optic devices as claimed in claim 1, further comprising configuring the liquid crystal cell to provide spatially variable control of light.

14. The method of manufacture of liquid crystal electro-optic devices as claimed in claim 1, wherein the top barrier comprises an inner top barrier and an outer top barrier.

15. The method of manufacture of liquid crystal electro-optic devices as claimed in claim 1, wherein the top barrier extends between said inner bottom barrier and said outer bottom barrier.

16. The method of manufacture of liquid crystal electro-optic devices as claimed in claim 1, further comprising depositing spacers defining a thickness of said liquid crystal reservoir between the top and bottom substrates.

17. The method of manufacture of liquid crystal electro-optic devices as claimed in claim 1, further comprising depositing spacers defining a thickness of said liquid crystal reservoir in said bottom barrier.

18. The method of manufacture of liquid crystal electro-optic devices as claimed in claim 1 wherein said device is a tunable lens or a beam steering device, further comprising depositing electrodes to apply a spatially non-uniform electric field in said liquid crystal material.

19. The method of manufacture of liquid crystal electro-optic devices as claimed in claim 1 wherein said device is a tunable lens or a beam steering device, further comprising depositing an alignment layer on a surface of said opposed substrates sandwiching said liquid crystal layer therebetween, said alignment layer defining a predominant orientation direction for liquid crystal molecules of said liquid crystal layer.

20. The method of manufacture of liquid crystal electro-optic devices as claimed in claim 1 wherein said device is a tunable lens or a beam steering device, further comprising depositing a hole-patterned electrode, a transparent planar electrode and a highly resistive layer associated with said hole-patterned electrode.

21. The method of manufacture of liquid crystal electro-optic devices as claimed in claim 1 wherein said device is a tunable lens or a beam steering device, further comprising forming first and second liquid crystal cells, wherein the first cell has liquid crystal oriented in a first linear direction, and the second cell has liquid crystal oriented in a second linear direction orthogonal to said first linear direction, said device acting on both linear polarizations of light.

22. The method of manufacture of liquid crystal electro-optic devices as claimed in claim 1, further comprising:

decreasing the vacuum after said top barrier and said bottom barrier merge or seal together, forcing said barriers to contract and embrace the liquid crystal material that was dispensed on said bottom substrate within said bottom barrier.

* * * * *